US009405630B2

(12) United States Patent
Duggan et al.

(10) Patent No.: US 9,405,630 B2
(45) Date of Patent: Aug. 2, 2016

(54) METHODS AND APPARATUS TO PERFORM SITE RECOVERY OF A VIRTUAL DATA CENTER

(71) Applicant: VMware, Inc., Palo Alto, CA (US)

(72) Inventors: Matthew Duggan, Cambridge, MA (US); Karthik Narasandra Manjunatha Rao, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 141 days.

(21) Appl. No.: 14/488,959

(22) Filed: Sep. 17, 2014

(65) Prior Publication Data

US 2016/0077919 A1    Mar. 17, 2016

(51) Int. Cl.
*G06F 11/00* (2006.01)
*G06F 11/14* (2006.01)
*G06F 9/455* (2006.01)

(52) U.S. Cl.
CPC ........ *G06F 11/1446* (2013.01); *G06F 9/45533* (2013.01); *G06F 2201/84* (2013.01)

(58) Field of Classification Search
CPC ............ G06F 11/2041; G06F 11/3447; G06F 11/2043; G06F 11/3433; G06F 11/1608; G06F 11/2048; H04L 41/12; H04L 41/0654; H04L 41/0659; H04L 43/0817
See application file for complete search history.

(56) References Cited

U.S. PATENT DOCUMENTS

| | | | |
|---|---|---|---|
| 8,121,966 B2* | 2/2012 | Routray | G06N 5/04 706/46 |
| 8,473,783 B2* | 6/2013 | Andrade | G06F 11/1438 709/223 |
| 8,700,946 B2* | 4/2014 | Reddy | G06F 11/2041 714/4.11 |
| 2011/0246991 A1 | 10/2011 | Lu et al. | |
| 2016/0048408 A1* | 2/2016 | Madhu | G06F 11/1458 718/1 |

OTHER PUBLICATIONS

"About Array-Based Protection Groups and Datastore Groups," VMware, Inc., retrieved from http://pubs.vmware.com/srm-51/topic/com.vmware.srm.admin.doc/GUID-9652C847-C351- . . . on Jun. 4, 2014, 2 pages.
"How SRM Computes Datastore Groups," VMware, Inc., retrieved from http://pubs.vmware.com/srm-51/topic/com.vmware.srm.admin.doc/GUID-F26BF881-4B72- . . . on Jun. 4, 2014, 2 pages.
"Creating Protection Groups," VMware, Inc., retrieved from http://pubs.vmware.com/srm-51/topic/com.vmware.srm.admin.doc/GUID-294475D7-B136- . . . on Jun. 4, 2014, 1 page.

(Continued)

*Primary Examiner* — Nadeem Iqbal

(57) ABSTRACT

Methods, apparatus, systems and articles of manufacture to perform site recovery of a virtual data center are disclosed. An example method includes discovering a work item to be included in a protection group associated with a recovery plan. The work item is not included in the protection group prior to execution of the site recovery workflow and the work item is discovered during execution of a site recovery workflow. The method also includes causing an operation of the site recovery workflow to be performed on the work item, and storing, in a persistable data container, a work item identifier identifying the work item. A result indicating the outcome of the operation performed on the work item is also stored. In some examples, the persistable data container is accessible to a status output device.

20 Claims, 10 Drawing Sheets

(56) References Cited

OTHER PUBLICATIONS

"Create Array-Based Protection Groups," VMware, Inc., retrieved from http://pubs.vmware.com/srm-51/topic/com.vmware.srm.admin.doc/GUID-1A573350-079E-... on Jun. 4, 2014, 2 pages.
"VMware Site Recovery Manager with EMC RecoverPoint, Implementation Guide," EMC Corp., 2008, 49 pages.
Slides titled, "Consistency Groups in a Nutshell," IBM Systems & Technology Group, IBM Corporation, Apr. 2007, 2 pages.
Data Sheet titled, "VMware vCenter Site Recovery Manager 5.5, Automated Disaster Recovery Orchestration," VMware, Inc., Jul. 2013, 4 pages.
Data Sheet titled, "VMware vCenter Site Recovery Manager 5.1, What Is VMware vCenter Site Recovery Manager?," VMware, Inc., Jun. 2012, 4 pages.
Technical document titled, "Site Recovery Manager Administration, vCenter Site Recovery Manager 5.1," VMware, Inc. Copyright 2008-2012, 100 pages.
"VMware vCenter Site Recovery Manager Customer FAQ," VMware, Inc., Sep. 29, 2009, 10 pages.
"SRM: Quick Steps when working with EMC RecoverPoint," post by ram@n dated Feb. 10, 2010, retrieved from http://virtualyzation.com/?p=328 on Dec. 10, 2014, 3 pages.
"SRM 5.5 Recovery Plans," THEITHOLLOW website, retrieved from http://theithollow.com/site-recovery-manager-5-5-guide/srm-5-5-recovery-plans/ on Dec. 10, 2014, 6 pages.
"Site Recovery Manager Administration, vCenter Site Recovery Manager 5.1," VMware, Inc., Copyright 2008-2014, 132 pages.
"Site Recovery Manager Installation and Configuration, vCenter Site Recovery Manager 5.1," VMware, Inc., Copyright 2008-2014, 110 pages.
Datasheet titled, "VMware vCenter Site Recovery Manager 5," Fujitsu Technology Solution 2013, retrieved from http://www.fujitsu.com/fts/products/computing/servers/primerg/virtualization/vmware, Feb. 22, 2013, 5 pages.

* cited by examiner

| 4. Cleanup Test Virtual Machines | 802 |
| 4.1 Protection Group Cleanup Workflow | 804 |
| 4.1.1 Discover Cleanup Test Virtual Machines | 806 |
| 4.1.2 Test Virtual Machines | 808 |

| 4. Cleanup Test Virtual Machines | 802 |
| 4.1 Protection Group Cleanup Workflow | 804 |
| 4.1.1 Discover Cleanup Test Virtual Machines | 806 |
| 4.1.2 Test Virtual Machines | 808 |
| 4.1.2.1 Virtual Machine 1 | 810 |
| 4.1.2.2 Virtual Machine 2 | 812 |

METHODS AND APPARATUS TO PERFORM SITE RECOVERY OF A VIRTUAL DATA CENTER

FIELD OF THE DISCLOSURE

This disclosure relates generally to virtual data centers, and, more particularly, to methods and apparatus to perform site recovery of a virtual data center.

BACKGROUND

Site recovery tools are used to protect virtual machines associated with a virtual data center. In the event that a protected virtual data center fails (for any number of reasons), such site recovery tools can be used to recover data stored at the protected virtual data center. The site recovery tool, when actuated, executes a workflow to cause the virtual machines of the protected virtual data center to be transitioned from a protected site residing at a first physical location to a recovery site residing at a second physical location. After the transition, the virtual machines begin operating at the recovery site.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
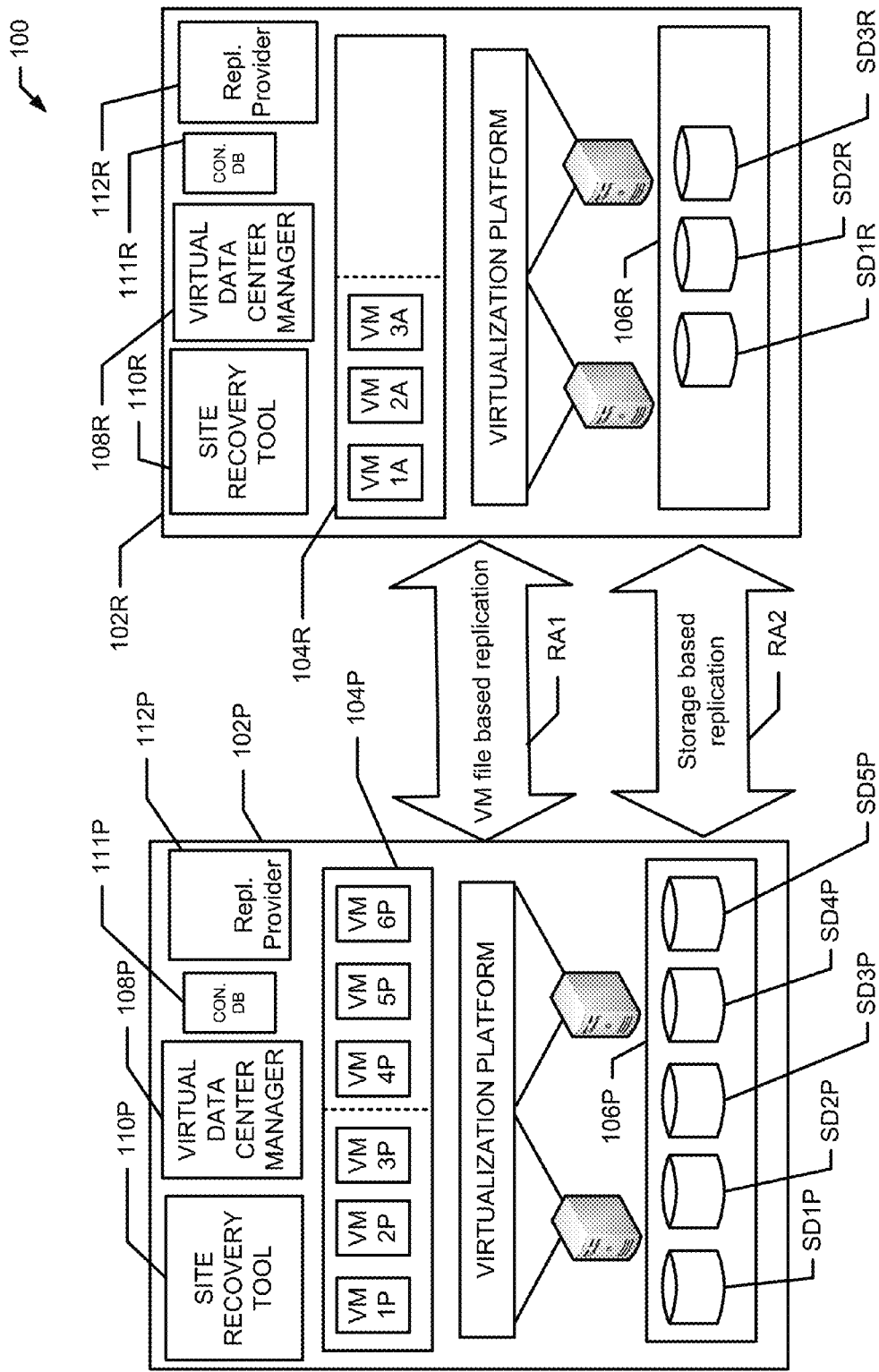
FIG. 1 is a block diagram of an example virtual computing environment having an example protected site and an example recovery site.

Example methods, apparatus, systems and articles of manufacture to perform site recovery of a virtual data center are disclosed herein. A disclosed example method includes discovering a work item while a site recovery workflow is executing and causing an operation of the site recovery workflow to be performed on the work item. The example method also includes storing, in a persistable data container, a work item identifier identifying the work item. A result indicating the outcome of the operation performed on the work item is also stored in the persistable data container and the persistable data container is accessible to a status output device.

The example method can further include causing the status out device to output status information during execution of the site recovery workflow. The status information can include the work item identifier and the result. In some example methods, the method also includes causing the status output device to output status information during execution of the site recovery workflow. The status information can include the work item identifier and the result.

In some examples, the method includes using the work item identifier and the result to reconstruct the site recovery workflow up to a last successfully completed workflow step and restarting the workflow from the last successfully completed workflow step. The work item and the result can be used to reconstruct the site recovery workflow in response to failure of the site recovery workflow.

In some examples, the method additionally includes issuing a discover command to a replication provider wherein the discover command is to identify a policy associated with the protection group and discovering the work item includes using the policy.

In further examples, the work item is a first work item and the work item identifier is a first work item identifier. Some such further example methods include issuing generating an initial display structure that presents a second work item identifier identifying a second work item but that does not present the first work item identifier. The second work item identifier was identified in the recovery plan prior to execution of the site recovery workflow. In some examples, the method includes, during execution of the site recovery workflow, updating the initial display structure to generate a modified display structure that incorporates the first work item identifier.

In some examples, the method includes determining that the site recovery workflow failed to execute successfully and determining an earlier time at which an earlier-executed site recovery workflow successfully executed. The method further includes reconstructing the earlier-executed site recovery workflow, and re-executing the earlier-executed site recovery workflow to cause data stored at a protected site to be recovered at a recovery site. In some examples, the data to be recovered is stored at the protected site as a set of snapshots collected site at the earlier time. Some example methods also include executing a cleanup site recovery workflow to detect a virtual machine on replicated storage that is not associated with the protection group.

Site recovery tools are used to transition a desired set of virtual machines of a virtual data center from a protected site residing at a first geographical location to a recovery site residing at a second geographical location. Such a transition can be initiated 1) in the event of a natural disaster affecting the primary site, 2) when needed to perform a planned migration of a virtual data center, 3) to test the operation of a disaster recovery plan, etc. Currently available site recovery tools are typically configured to perform the site transition using a workflow that specifies a set of steps to be executed, an order in which the steps are to be executed, etc. The steps of the workflow operate on a group of devices/work items (collectively referred to as a protection group) identified in a recovery plan. In some examples more than one protection group is identified in a recovery plan. A recovery plan defines a set of protection groups on which a site recovery workflow can be executed. It also provides the user to set certain virtual machine specific and replication specific options which define the steps that are executed in a site recovery workflow.

In existing systems, a user identifies devices/work items to be included in the protection group of the recovery plan based on the configuration of the virtual data center. The user then manually supplies information identifying the devices/work items to the site recovery tool. When the virtual data center is reconfigured, a list of devices to be included in the protection group is revised, as needed, to support the new configuration. However, existing site recovery tools are not equipped to automatically determine when the list of devices to be included in the protection group has been revised.

As a result, each time a virtual data center is reconfigured, the user must again manually enter a list of the devices to be added to (or removed from) the protection group(s) into the site recovery tool. Given that virtual data centers are being reconfigured at an increasingly rapid pace, manually entering the list of protection group devices/work items each time a reconfiguration occurs is becoming an increasingly burdensome task.

Moreover, existing site recovery tools are typically designed to use the list of devices/work items in the protection group to build a display structure that presents the devices/work items in a desired format. The display structure is then populated with progress/status information as steps in the workflow are executed on the corresponding devices/work items. However, the display structure is typically static in that the site recovery tool does not have a mechanism to automatically revise/modify the display structure to accommodate any changes to the list of devices/work items included in a protection group. Thus, even if existing site recovery tools were able to capture information identifying revisions to the list of individual devices/work due to a virtual data center reconfiguration, such tools are unable to display the status of workflow operations performed on such newly added devices/work items.

Example methods, apparatus, systems and articles of manufacture described herein address some of these issues by incorporating a discover operation into a site recovery workflow. The example discover operation allows a site recovery tool to automatically identify and obtain information about changes to the list of work items/devices included in a protection group. Thus, the example discover operation eliminates the need to manually enter information identifying devices/work items to the site recovery tool each time a virtual data center is reconfigured. The example methods, apparatus, systems and articles of manufacture also provide a mechanism to provide status information about the progress of workflow operations performed on such discovered devices/work items. The ability to present status information on workflow steps performed on the protection group devices/work items gives a user the ability to identify and, if needed, respond to workflow steps that are progressing in an undesired manner.

Additionally, as described above, the example methods, apparatus, systems and articles of manufacture (e.g., physical storage media) disclosed herein provide a mechanism by which the results of the workflow steps performed on discovered data items are saved in a persistable memory. Such saved information can then be used to reconstruct/reconstitute an in-progress workflow that was halted mid-execution due to a server crash. Thus, when the site recovery tool is brought back online, the workflow need not be restarted from the beginning but can instead be restarted from the last successful step before the crash occurred.

The example methods, apparatus, systems and articles of manufacture (e.g., physical storage media) disclosed herein can also be used to determine that data stored in the recovery site at a second, later time is to be replaced with data stored in the recovery site at a first, earlier time when a test site recovery workflow performed at the second time indicates that the test site recovery workflow performed at the second, later time was unsuccessful.

The example methods, apparatus, systems and articles of manufacture (e.g., physical storage media) disclosed herein are also able to identify virtual machines having virtual machine files, only some of which reside on replicated storage, virtual machines that reside on a replicated storage device but that are not associated with a protection group, etc.

These and other example methods, apparatus, systems and articles of manufacture (e.g., physical storage media) to perform site recovery of a virtual data center are disclosed in further detail below.

FIG. 1 illustrates an example virtual computing environment 100 that includes an example first virtual data center 102P, also referred to as the protected site 102P, located at a first geographical location. The first virtual data center 102P includes example first virtual machines 104P (VM1P, VM2P, VM3P, VM4P, VM5P, VM6P) implemented on a hypervisor that operates on top of a set of physical servers via a virtualization platform 105P and further includes example first storage devices 106P (SD1P, SD2P, SD3P, SD4P, SD5P). The virtual machines 104P and storage devices 106P are managed, configured and provisioned by an example first virtual data center manager 108P which can be implemented using, for example, VMware Virtual Center. In the event of a disaster affecting the protected site 102P and/or to execute a planned migration, etc., an example first site recovery tool 110P is designed to cause one or more of the first virtual machines 104P and one or more of the first storage devices 106P to be transitioned from the protected site 102P to an example recovery site 102R, in a process called failover. The recovery site 102R has hardware, network and storage resources sufficient to support the virtual machines 104P and storage device 106P to be transitioned from the protected site 102P. As used herein, devices designated with a reference numeral having a suffix "P" and a suffix "R" are associated with the protected site 102P and the recovery site 102R, respectively. The protection site 102P and the recovery site 102R are coupled via any type of communication link.

An example first replication provider 112P supports the transition of the example first virtual machines 104P by replicating one or more files associated with the first virtual machines 104P and/or information stored in one or more of the example first storage devices 106P at the example recovery site 102R. The virtual machines 104P and/or data storage devices 106P to be replicated are selected by the user during a replication configuration process in which the user reviews the configuration of the virtual data center 102P and identifies one or more of the virtual machines 104P and/or the storage devices 106P that support business-critical services, also referred to as business-critical virtual machines/storage devices. For descriptive purposes, the virtual machines VM1P, VM2P and VM3P of FIG. 1 are designated as supporting business critical services and the storage devices SD1P, SD2P and SD3P are designated as storing data used to support business critical services. In some examples, all of the virtual machines 104P and storage devices 106P (not just the virtual machines and storage devices that support business-critical services) are designated for replication from the protected site 102P to the recovery site 102R. Such a configuration may be used to perform a planned migration of all virtual machines 104P and storage devices 106P from the protected site 102P to the recovery site 102R.

In some examples, during the replication configuration process, the user enters a set of replication settings for each of the virtual machines and storage devices at the protected site 102P that are to be replicated to the recovery site 102R. Such replication settings may indicate whether replication is enabled or disabled for a virtual machine, may provide a frequency at which data associated with a virtual machine 104P and/or storage device 106P is to be replicated, may specify a target storage device on the recovery site 102R to which a virtual machine 104P and/or storage device 106P is to be replicated, etc. When the replication configuration process is complete, the replication settings are stored as a replication configuration in an example replication configuration database 111P and the replication provider 112P periodically (or aperiodically) replicates the data stored at the protected site 102P to the recovery site 102R based on the stored replication settings.

In some examples, the replication provider 112P is used to directly associate each of the business-critical virtual machines 104P and/or storage devices 106P with a specific protection group and/or to use a storage profile to indirectly associate a business-critical virtual machine 104P and/or storage device 106P with a specific protection group. In some examples, the virtual data center manager 108P is used to directly or indirectly associate the business-critical virtual machines 104P and/or storage devices 106P with a protection group. In some examples, a storage profile (also referred to as a policy) is a policy(ies) that resides in the virtual data center manager 108P and can be applied to virtual machines and/or storage devices without having to interact with the site recovery tool 110P. A storage profile(s) can be associated with a protection group such that a virtual machine 104P or storage device 106P having the storage profile will be included in the associated protection group.

In some examples, storage devices 106P having a storage profile that meets a criteria associated with a protection group are to be included in that protection group. For example, a storage profile associated with the storage device SD1P may indicate that a first type of data (e.g., data associated with a particular business application) stored in the storage device SD1P. Further, a first protection group may be configured to include all storage devices 106P having the first type of data. Thus, all of the storage devices 106P having the first type of data are to be included in the protection group. By indirectly associating the set of storage devices with a protection group in this manner, the set of storage devices to be included in a protection group can be changed by modifying the storage devices associated with a storage profile (independently of the site recovery tool 110P) via the virtual data center manager 108P instead of having to modify the criteria associated with the protection group. Users can add/delete devices to/from a storage profile using the virtual data center manager 108P. Because a storage profile in Virtual Data center manager is associated with a protection group in the site recovery tool, revisions to devices associated with a storage profile will lead to a cascading revision to the contents of a corresponding protection group in the site recovery tool.

In some examples, the replication provider 112P is tightly integrated with the virtual data center manager 108P such that much of the data used by (or created with) the replication tool 112P is made available via the virtual data center manager 108P and vice versa.

In some examples, the replication provider 112P performs two different types of replication. In some such examples, a first type of replication is virtual-machine file based replication (indicated by a first replication arrow RA1) in which virtual machine files associated with a virtual machine are replicated from a virtual machine host server at the protected site 102P to the recovery site 102R. In some such examples, a second of the replication providers performs storage-based (also referred to as array-based) replication (indicated by a second replication arrow RA2) in which data is block copied from a storage device at the protected device to a storage device at the recovery site 102R. The data contained in the set of storage devices to be replicated may include, for example, application data and/or virtual machines files. In some examples, the storage devices to be replicated are organized into a consistency group. A consistency group is a group of storage blocks that are replicated as a single unit. As a result, all of the data in a consistency group at the recovery site 102R existed at the protected site 102P at a same point in time. Consistency groups are considered crash consistent in that the storage will be in a consistent state regardless of when a crash occurs. The files associated with virtual machines included in a consistency group are replicated together and the virtual machines included in the protection group associated with the consistency group are recovered together.

To effect transition of the business-critical virtual machines VM1P, VM2P and VM3P and data storage devices SD1P, SD2P and SD3P to the recovery site 102R, the business critical virtual machines VM1P, VM2P and VM3P are powered down and virtual machines VM1R, VM2R, VM3R at the recovery site 102R are powered on. In practice, before the transition, virtual machines VM1R, VM2R, VM3R are not operational on the recovery site 102R. In some examples, a set of placeholder virtual machine files are present on the recovery site 102R. Each of the placeholder virtual machine files maps to a protected virtual machine existing on the protected site 102P and the placeholder virtual machines files are used as a container of settings. When a recovery operation is performed, the settings in the placeholder virtual machine files are used to configure the virtual machines that will be transitioned from the protected site 102P to the recovery site 102R (i.e., the placeholder virtual machine files are replaced with the protected site virtual machine files that are associated with the storage containing the recovered data).

During the transition process, the placeholder virtual machine files are replaced with the protected virtual machine files that are mapped to the placeholder virtual machine files and thereafter powered up. In some examples, the recovery site virtual machines are placed into the recovery site inventory during the transition such that placeholder virtual machine files need not be placed on the recovery site 102R. In some examples, the virtual machines VM1P, VM2P, VM3P and the virtual machines VM1R, VM2R, VM3R are configured to share a set of a virtual machine file disk(s) such that the transition is accomplished by causing the virtual machines VM1P, VM2P, VM3P on the protected site 102P to switch from a read/write mode of the virtual machine files to a read-only mode and by causing the virtual machines VM1R, VM2R, VM3R on the recovery site 102R to switch from a read-only mode of the virtual machines files to a read/write mode.

After the transition, the example virtual machines VM1R, VM2R, VM3R powered-on at the example recovery site 102R operate as an example second virtual data center 102R to provide the data center services previously provided by the first virtual data center 102P. A second example virtual data center manager 108R, a second example replication provider 112R and a second example site recovery tool 110R located at the recovery site 102R operate in the same manner as the first virtual data center manager 108P, the first replication provider 112P and the first site recovery tool 110P, respectively. In some examples, a workflow operation referred to as "reprotect" workflow can be used to cause the data at the recovery site 102R to be replicated back to the protected site 102P. This operation reverses the direction of replication (i.e., the original protected site 102P now operates as the recovery site 102R and original recovery site operates as the new protected site 102P). Thus, the virtual machines VM1R, VM2R, VM3R can be transitioned back to the protected site 102P at a later time in a process called failback. In some examples, multiple protected site(s) 102P share a same recovery site 102R.

Figure 2:
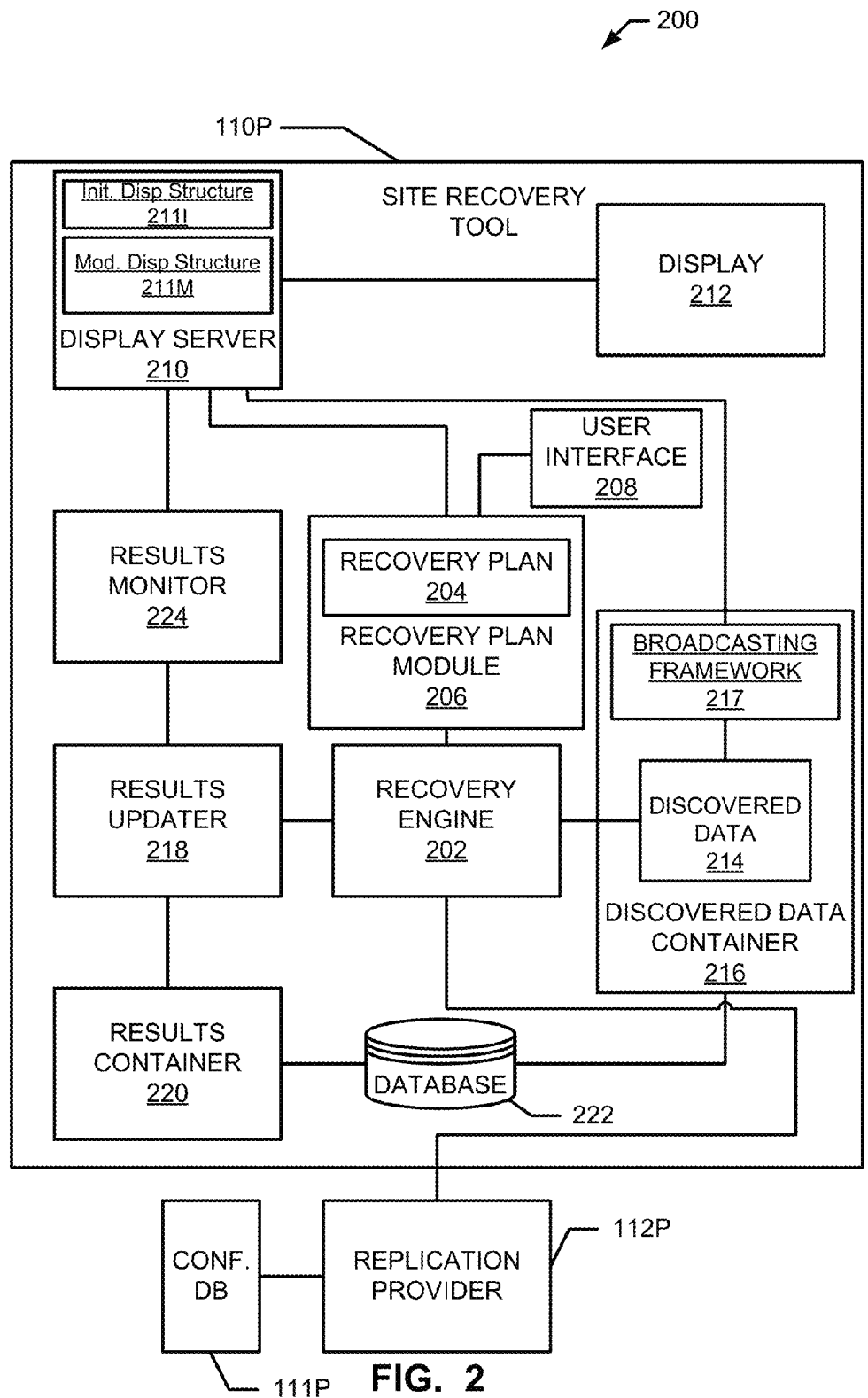
FIG. 2 is a block diagram of an example site recovery tool located at the protected site and the recovery site of FIG. 1.

FIG. 2 is a block diagram 200 illustrating an example implementation of the example site recovery tool 110R depicted in FIG. 1. The example site recovery tool 110P includes an example recovery engine 202 that operates to transition select ones of the virtual machines 104P (e.g., VM1P, VM2P, VM3P) and storage devices 106P (e.g., SD1P, SD2P, SD3P) of FIG. 1 from the protected site 102P to the recovery site 102R. In some examples, the recovery engine 202 performs the transition by executing a set of workflow steps associated with a workflow. Example workflows can be used to execute a failover operation, a test failover operation, a reprotect operation, a cleanup operation, etc., as described below in connection with FIG. 3A and FIG. 3B. In some examples, a workflow can include any number of workflow steps that perform operations such as, syncing data stored at the protected site 102P with data stored at the recovery site 102R, syncing virtual machines at the protected site 102P and the recovery site 102R, powering virtual machines 104P, 104R on/off, etc.

A workflow is initiated when, for example, a user determines that the protected site 102P is at risk due to an impending disaster. The workflow may also be manually initiated when a planned migration is scheduled to occur, to test the execution of a workflow, to determine whether one or more business-critical virtual machines are not fully protected, etc. The steps of the initiated workflow are executed on an example recovery plan 204 stored at an example recovery plan module 206. The recovery plan on which the workflow is to be executed is selected by a user via an example user interface 208 when the site recovery tool 110P is actuated. In some examples, the recovery plan 204 is updated by, for example, the recovery engine 202 to indicate a state of the workflow as it is being performed on the recovery plan 204.

The example recovery plan 204 identifies a select set of virtual machines (e.g., VM1P, VM2P and VM3P) and/or storage devices (e.g., SD1P, SD2P and SD3P) on which the steps of the workflow are to operate. The select set of virtual machines VM1P, VM2P and VM3P and storage devices SD1P, SD2P and SD3P are collectively referred to as a protection group and the members of the protection group are individually referred to as work items. The work items included in the protection group can also be associated with example settings in the recovery plan 204. Such example settings can be associated with individual ones of the work items included in the protection group and can include: a power-on priority that indicates when an individual work item (e.g., a virtual machine) is to be powered on relative to other work items of a same type (e.g., an order in which virtual machines are to be power on relative other virtual machines) in the protection group, an IP address assigned to the individual work item, a final power state (on or off) to be assigned the individual work item, customized steps (e.g., scripts) to be executed on an individual work item during a workflow executed on the corresponding recovery plan 204, etc.

To create the example recovery plan 204, a user(s) supplies a list of work item identifiers identifying the work items to be included in a protection group associated with the recovery plan 204 via an example user interface 208. In some such examples, the user(s) supplies the list of work items by selecting the work item identifiers to be included in the protection group from a list of all of the virtual machines and storage devices being replicated at the recovery site. In some examples, a list of all of the virtual machine storage devices being replicated to the recovery site 102R can be obtained by the site recovery tool 110P from the example replication configuration database 111P associated with the example replication provider 112P and/or the virtual data center manager 108P. The user-supplied work item identifiers are used to populate the protection group which is stored in association with the example recovery plan 204.

In some examples, the list of work items included in the protection group becomes outdated between a first time at which the user enters the work items (e.g., when the recovery plan is created) and a second time at which a workflow is initiated on the corresponding recovery plan. This happens when, for example, a reconfiguration operation performed on the first virtual data center 102P occurs after the protection group was initially populated but before a workflow was initiated on the recovery plan 204. In some examples, the list of work items can become outdated when the example virtual data center manager 108P (see FIG. 1) is used to associate one or more of the protected site virtual machines 104P with a storage profile contained in the protection group. To ensure that the protection group associated with the recovery plan 204 is up-to-date, the recovery engine 202 issues a discover command to the replication provider 112P while the workflow is executing as described in greater detail below.

When the workflow begins executing on the example recovery plan 204, the example recovery plan 204 is input to an example display server 210 that uses the recovery plan 204 to identify the work items included in the protection group of the recovery plan 204. The display server 210 then creates an initial display structure 211I that includes the work items initially included in the protection group, if any, (i.e., the work items included in the protection group at the time of workflow initiation). For example, the initial display structure 211I can be configured as a hierarchical tree structure in which the initial work items are represented as nodes of the tree. The display server 210 supplies the initial display structure 211I to a display 212 for presentation to a user. In some examples, the display server 210 and display 212 operate together to form a status output device.

Next, the example recovery plan 204 is supplied to the example recovery engine 202 which issues a discover command to the example replication provider 112P. The replication provider 112P responds to the discover command by searching the example replication configuration database 111P to identify all of the consistency groups associated with the protection group. Each consistency group is identified using a single string identifier. The example replication provider 112P then searches the data stored in the consistency groups to identify the virtual machines included in the consistency groups so that they can be added to the list of work item identifiers to be included in the protection group. In some examples, the replication provider 112P and/or the recovery engine 202 is configured to compare the list of work item identifiers discovered by the replication provider 112P to a list of user-supplied work item identifiers to distinguish new work items from previously known work items (e.g., the user-supplied work items). In some examples, the replication provider 112P and/or the recovery engine 202 is further configured to determine if any of the user-supplied work item identifiers initially included in the protection group, are not discovered during the discovery process. In some such examples, the replication provider and/or the recovery engine 202 is further configured to notify the example recovery plan module 206 of any user-supplied work items that are not discovered and the recovery plan module 206 removes such user-supplied work items from the recovery plan. In some such examples, the recovery plan module 206 and/or the recovery engine 202 notifies the display server 210 that work item identifiers associated with the removed work items are to be removed from the initial display structure 211I when a modified display structure 211M is generated. In some examples, the discover operation is issued each time a new workflow step is performed by the recovery engine 202.

As described above, during a replication configuration process, the virtual machines and/or storage devices in a consistency group are associated either directly or indirectly with a protection group in the replication configuration database 111P. In some examples, the virtual machines and/or storage devices in a consistency group are associated directly or indirectly with a protection group by the virtual data center manager 108P during a virtual data center configuration operation. In either event, the protection group information is obtainable by the replication provider 111P during the discover operation.

Further, in some examples, although, as described above, the virtual data center manager 108P of FIG. 1 blocks the protection group from modification when a workflow operating on the protection group has been initiated, there are instances in which workflow items are removed during execution of the workflow. In some such instances, the recovery engine 202 is configured to supply an error message to the results updater 218 when the recovery engine 202 attempts to operate on the removed workflow item. In some examples, the error message indicates that the workflow operation failed because the work item subject to the operation has been removed from the protection group.

The example replication provider 111P supplies the information identifying the newly discovered work items (referred to as work item identifiers) to the example recovery engine 202 which, in turn, causes the work item identifiers to be stored as discovered data 214 in an example discovered data container 216. The supplied information can be formatted as a unique string identifying a work item (e.g., either a virtual machine or a consistency group). In addition to a unique string, virtual machine properties may be included such as virtual machine name, a cluster to which the virtual machine is assigned, and/or another unique identifier associated with and/or assigned by the virtual data center manager, etc. The unique string identifier supplied by the replication provider 111P can also identify a consistency group. For example, in response to some example discovery operations the replication provider supplies information identifying a consistency group with which a virtual machine is associated.

In some examples, when the discovered data is stored in the discovered data container, the data is associated with the workflow step during which the discovered data was discovered. In some examples, a workflow step includes one or more substeps (also referred to as jobs), each of which is individually performed on the work items included in a protection group. In some such examples, the discovered data container 206, and/or the recovery engine 202 causes the discovered data discovered during the execution of a corresponding job to be associated with the corresponding job when stored in the discovered data container 206. In some examples, the discovered work item identifiers are stored losslessly (i.e., a work item identifier discovered during execution of two different jobs is stored in the discovered data container twice, once in association with a first of the two different jobs and once in association with a second of the two different jobs).

In some examples, an example broadcasting framework 217 supplies the work item identifiers to the example display server 210 which, in turn, uses the work item identifiers to modify the initial display structure 211I to incorporate the discovered work item identifiers. The modified display structure 211M is then supplied to the example display 212 for presentation thereon. In some examples, upon receiving the recovery plan 204, the display server 210 registers with the discovered data container 216 to request notifications be transmitted when new work items associated with the recovery plan are discovered. Thereafter, when new work item identifiers are stored in the discovered data container 216, a notification is transmitted to the display server 210 which responds to the notification by fetching the new work item identifiers from the discovered data container 216.

In addition, the example recovery engine 202 causes the workflow steps to be performed on the discovered work items and on the initial set of user-supplied work items. The recovery engine 202 then provides results indicating an outcome of each of the workflow steps to an example results updater 218 which causes the results to be stored in an example results container 220 implemented using a persistable data storage device (e.g., a hard disk, a hard drive, etc.). The results are also stored in an example database 222 coupled to the results container 220. The discovered data container 216 is also coupled to the database 222 and supplies information related to the discovered work items to the database 222. In some examples, the results stored in the database 222 and the results container 220 include information identifying: a particular work operation, a work item on which the work operation was performed, and the status of the operation (e.g., in-progress, completed, failed, skipped, canceled, etc.).

An example results monitor 224 determines when new results have been placed into the example results updater 218 and subsequently supplies the results to the example display server 210. The display server 210 uses the results information to populate the modified display structure 211M to incorporate the updated results. In some examples, the updated results are incorporated by changing the status of a work operation being performed on a work item in the initial display. For example, the status of a work operation, such as a sync operation, performed on one of the virtual machines 106P (see FIG. 1) could be changed from "in-progress" to "completed." A sync operation can be, for example, a data sync from the protected site 102P to the recovery site. Thus, the modified display structure 211M presents information identifying the discovered work items and the results of workflow steps performed on the discovered work items.

In some instances, a server crash affecting the example site recovery tool 110P may cause a workflow to halt in the middle of execution. In such a scenario, the site recovery tool 110P can use the information stored in the discovered data container 216, in the results container 220 and/or in the database 222 to reconstruct the workflow as it existed prior to the crash. Thus, the site recovery tool 110P uses the stored discovered data 214 in the data container 214 and the corresponding results data stored in the results container 220 (and/or the database 220) to reconstruct the workflow as it was being performed prior to the crash. The ability to reconstruct the workflow in this manner prevents the user from having to restart the workflow from the beginning. Instead, the site recovery tool 110P is used to restart the workflow from the point prior to the crash.

In some instances, a failure of the site recovery tool may occur during the execution of a workflow but before the protected and recovery sites 102P, 102R have been fully synced. When this occurs, the most recent copy of the data at the protected site 102P may not have been successfully replicated to the recovery site 102R. Moreover, the integrity of the data residing at the protected site 102P may be questionable. In such an event, a user may opt to restart the workflow using protected data from an earlier point in time (e.g., a time at which the integrity of the data is believed to be intact). In some examples, the site recovery tool 110P is used to reconstruct a previously-executed workflow that was successfully completed. In addition, the site recovery tool 110P is used to re-execute the reconstructed workflow. However, the site recovery tool 110P performs the reconstructed workflow on a version of the protected data as it existed at the time that the workflow was originally executed instead of the data as it currently exists. In some such examples, the data as it existed at the time that the workflow was originally executed resides on the protected site 102P in a snapshot library.

In some examples, the blocks of FIG. 1 can be implemented using object oriented programming. In some such examples, the blocks represent objects having the functionality and the characteristics described above.

While an example manner of implementing the site recovery tool 110P of FIG. 1 is illustrated in FIG. 2, one or more of the elements, processes and/or devices illustrated in FIG. 2 may be combined, divided, re-arranged, omitted, eliminated and/or implemented in any other way. Further, the example first virtual data center 102P, the example second virtual data center 102R, the example protected site virtual machines 104P, the example recovery site virtual machines 104R, the example protected site virtualization platform 105P, the example recovery site virtualization platform 105R, the example protected storage devices 106P, the example recovery storage devices 106R, the example first virtual data center manager 108P, the example second virtual data center manager 108R, the example protected site recovery tool 110P, the example recovery site recovery tool 110R, the example first replication provider 112P, the example second replication provider 112R, the example first replication configuration database 112P, the example second replication configuration database 114R, the example recovery engine 202, the example recovery plan 204, the example recovery plan module 206, the example user interface 208, the example display server 210, the example initial display structure 211I, the example modified display structure 211M, the example display 212, the example discovered data 214, the example discovered data container 216, the example broadcasting framework 217, the example results updater 218, the example results container 220, and the example results monitor 224 and/or, more generally, the example virtual computing environment 100 of FIG. 1 may be implemented by hardware, software, firmware and/or any combination of hardware, software and/or firmware. Thus, for example, any of the example first virtual data center 102P, the example second virtual data center 102R, the example protected site virtual machines 104P, the example recovery site virtual machines 104R, the example protected site virtualization platform 105P, the example recovery site virtualization platform 105R, the example protected storage devices 106P, the example recovery storage devices 106R, the example first virtual data center manager 108P, the example second virtual data center manager 108R, the example protected site recovery tool 110P, the example recovery site recovery tool 110R, the example first replication provider 112P, the example second replication provider 112R, the example first replication configuration database 112P, the example second replication configuration database 114R, the example recovery engine 202, the example recovery plan 204, the example recovery plan module 206, the example user interface 208, the example display server 210, the example initial display structure 211I, the example modified display structure 211M, the example display 212, the example discovered data 214, the example discovered data container 216, the example broadcasting framework 217, the example results updater 218, the example results container 220, and the example results monitor 224 and/or, more generally, the example virtual computing environment 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example first virtual data center 102P, the example second virtual data center 102R, the example protected site virtual machines 104P, the example recovery site virtual machines 104R, the example protected site virtualization platform 105P, the example recovery site virtualization platform 105R, the example protected storage devices 106P, the example recovery storage devices 106R, the example first virtual data center manager 108P, the example second virtual data center manager 108R, the example protected site recovery tool 110P, the example recovery site recovery tool 110R, the example first replication provider 112P, the example second replication provider 112R, the example first replication configuration database 112P, the example second replication configuration database 114R, the example recovery engine 202, the example recovery plan 204, the example recovery plan module 206, the example user interface 208, the example display server 210, the example initial display structure 211I, the example modified display structure 211M, the example display 212, the example discovered data 214, the example discovered data container 216, the example broadcasting framework 217, the example results updater 218, the example results container 220, and/or the example results monitor 224 are hereby expressly defined to include a tangible computer readable storage device or storage disk such as a memory, a digital versatile disk (DVD), a compact disk (CD), a Blu-ray disk, etc. storing the software and/or firmware. Further still, the example recovery site tool 110P of FIG. 1 may include one or more elements, processes and/or devices in addition to, or instead of, those illustrated in FIG. 2, and/or may include more than one of any or all of the illustrated elements, processes and devices.

Flowcharts representative of example machine readable instructions for implementing the site recovery tool 110P of FIG. 1 and FIG. 2 are shown in FIGS. 3A, 3B, 4, 5, 6, and 7. In such examples, the machine readable instructions comprise programs for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire programs and/or parts thereof could alternatively be executed by a device other than the processor 912 and/or embodied in firmware or dedicated hardware. Further, although the example programs are described with reference to the flowcharts illustrated in FIGS. 3A, 3B, 4, 5, 6, and 7, many other methods of implementing the example site recovery tool 110P may alternatively be used. For example, the order of execution of the blocks may be changed, and/or some of the blocks described may be changed, eliminated, or combined.

As mentioned above, the example processes of FIGS. 3A, 3B, 4, 5, 6, and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3A, 3B, 4, 5, 6, and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 3A:
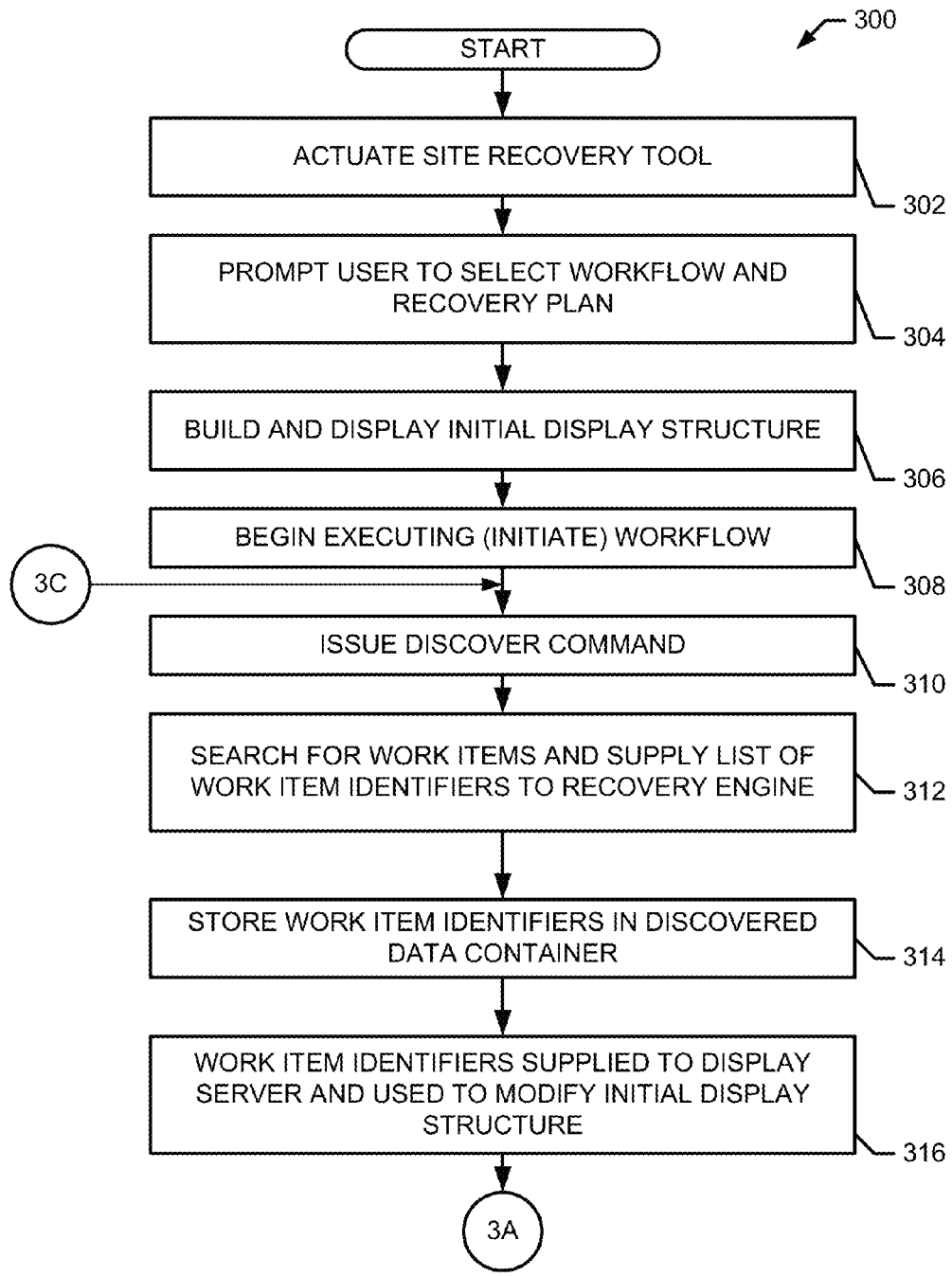
FIG. 3A and FIG. 3B is a flow chart representative of example machine-accessible instructions that may be executed to implement the site recovery tool of FIG. 2.
Figure 3B:
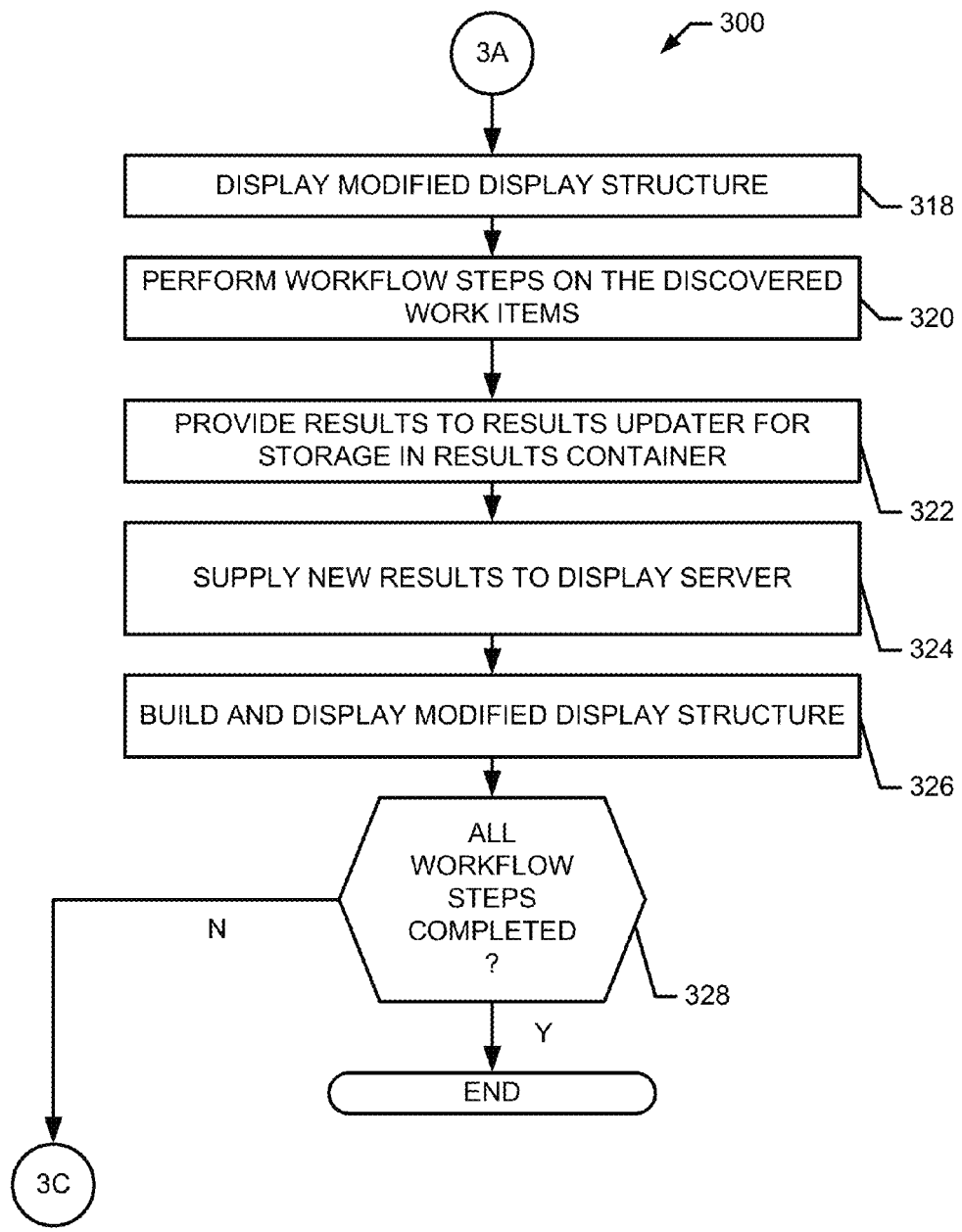

Example machine readable instructions that may be executed to implement the site recovery tool 102P of FIGS. 1 and 2 are represented by the flowchart 300 illustrated in FIGS. 3A and 3B. The example machine readable instructions 300 may be executed at intervals (e.g., predetermined intervals), based on an occurrence of an event (e.g., a predetermined event), etc., and/or any combination thereof. The example machine readable instructions represented by the flowchart 300 begin at a block 302.

At a block 302, the example site recovery tool 110P is actuated, when, for example, a user determines that the protected site 102P (see FIG. 1) is at risk due to an impending disaster. The site recovery tool 110P of FIG. 1 may also be actuated when a planned migration is scheduled to occur or to test a failover workflow on a recovery plan. At a block 304, the example recovery plan module 206 (see FIG. 2) prompts the user via the example user interface 208 (see FIG. 2) to identify a workflow to be performed and a recovery plan (e.g., the recovery plan 204 of FIG. 2) on which the workflow is to operate.

At a block 306, the example display server 210 uses the example recovery plan 204 to build an example initial display structure 211I (see FIG. 2) and the initial display structure 211I is presented to the user at the example display 212 (see FIG. 2). As described above, the initial display structure 211I can be configured as a tree structure in which the user-supplied work items are represented as nodes of the tree.

Next, at a block 308, the example recovery engine 202 begins executing the workflow on the recovery plan 204. In some examples, when the recovery engine 202 begins executing the workflow, the recovery engine 202 notifies the example virtual data center manager 108P (see FIG. 1) that the workflow is being executed and provides the virtual data center manager 108P with the identity of the protection group on which the workflow is to be executed. In response, the virtual data center manager 108P blocks further changes to the protection group until the workflow has finished executing.

At a block 310, the example recovery engine 202 issues a discover command to the example first replication provider 112P (see FIG. 1) to ensure that the protection group associated with the recovery plan is up-to-date. At a block 312, the first replication provider 112P responds to the discover command by searching the first replication configuration database 111P (see FIG. 1) to identify work items not initially included in the recovery plan 204 and then supplies information identifying the discovered work items (referred to as work item identifiers) to the recovery engine 202. At a block 314, the recovery engine 202 causes the work item identifiers to be stored in the example discovered data container 216 (see FIG. 2).

Referring also to FIG. 3B, the example discovered data container 216 supplies the work item identifiers to the example display server 210 at a block 316 which, in turn, uses the information to create the example modified display structure 211M that incorporates the discovered work items. The example modified display structure 211M is then supplied to the example display 212 for presentation to the user at a block 318 (as illustrated by the connection point 3A on FIG. 3A and FIG. 3B).

In addition, at a block 320, the example recovery engine 202 causes the steps of the workflow to be performed on both the discovered work items and on the initial set of user-supplied work items. At a block 322, the recovery engine 202 provides results indicating an outcome of each of the workflow steps performed on each work item to an example results updater 218 (see FIG. 2). The results updater 218 causes the results to be stored in the example results container 220 (see FIG. 2) and in the example database 222 (see FIG. 2).

At a block 324, the example results monitor 224 (see FIG. 2) determines when new results have been placed into the example results updater 218 and subsequently supplies the results to the example display server 210. At a block 326, the display server 210 uses the updated results to further incorporate the results into the modified display structure 211M and thereby provide the user with real-time workflow progress information. At a block 328, the recovery engine determines whether there are additional workflow steps to be performed. If there are additional workflow steps to be performed, control returns to the block 310 (as illustrated by the connection point 3C found on FIG. 3A and FIG. 3B) and the blocks subsequent thereto as described above. If there are no additional workflow steps, the method ends.

Figure 4:
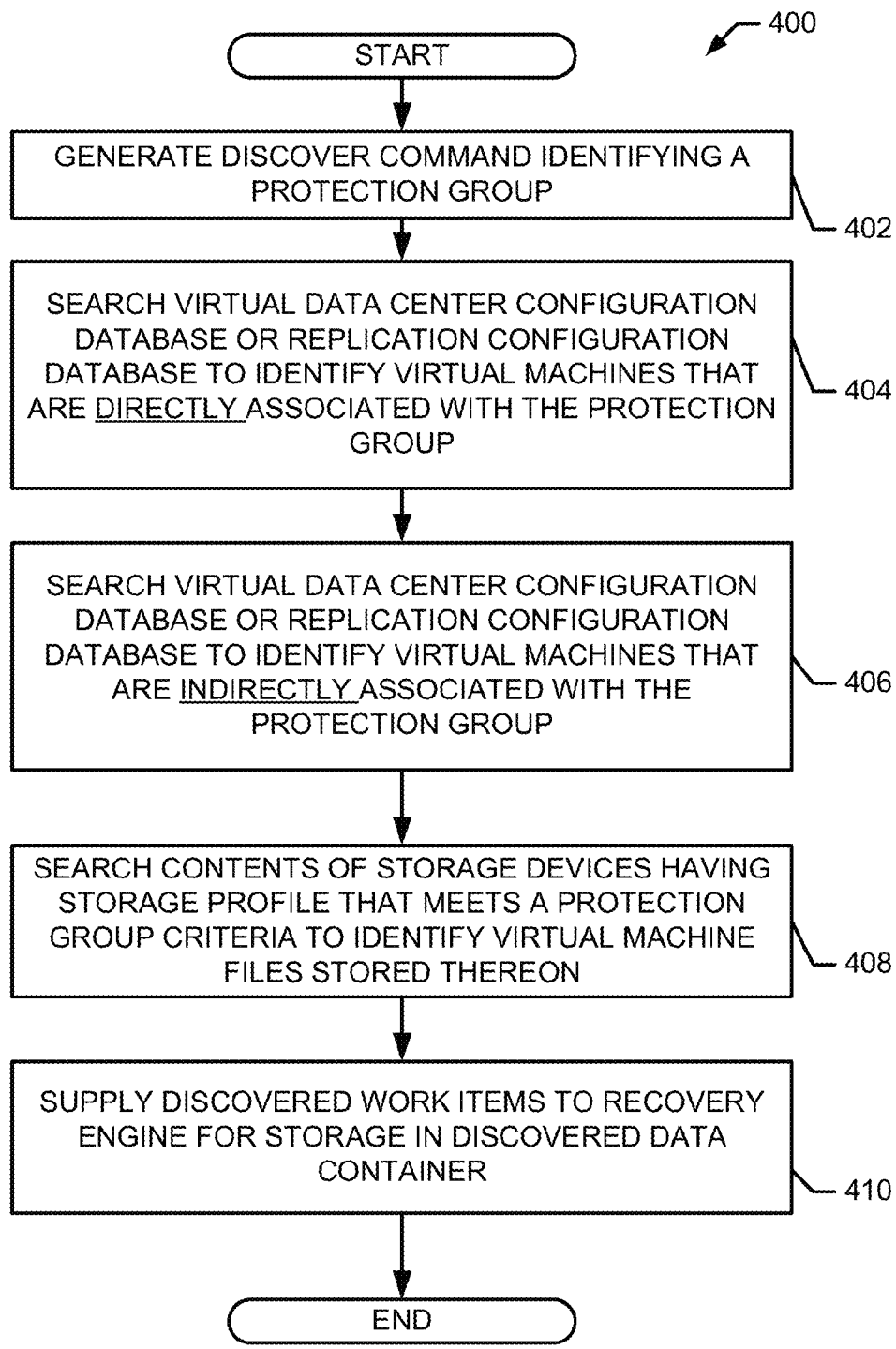
FIG. 4 is a flow chart representative of example machine readable instructions that may be executed to implement the site recovery tool of FIG. 2.

Example machine readable instructions that may be executed to implement the site recovery tool 102P of FIGS. 1 and 2 are represented by the flowchart 400 illustrated in FIG. 4. The example machine readable instructions 400 may be executed at intervals (e.g., predetermined intervals), based on an occurrence of an event (e.g., a predetermined event), etc., and/or any combination thereof.

The example machine readable instructions represented by the flowchart 400 begin at a block 402 at which the example recovery engine (see FIG. 2) generates the discover command identifying a protection group associated with the recovery plan 204 (see FIG. 2) on which a workflow is to be performed. At a block 404, the example replication provider 112P (see FIG. 1) searches the example replication configuration database 111P (see FIG. 1) to identify virtual machines and/or storage devices that are directly associated with the protection group. At a block 406, the replication provider 112P searches the replication configuration database 111P to identify storage devices that are indirectly associated with the protection group. In some examples, the search performed by the replication provider 112P at the block 406 includes identifying storage profiles that meet a criteria associated with the protection group. Information identifying the storage devices having a storage profile that meets the criteria (e.g., work item identifiers) are then included in the list of discovered work items. In some examples, at a block 408, the replication provider 112P also searches the storage devices identified in the list of work item identifiers to identify the virtual machine files stored in such storage devices and includes the identified virtual machines in the list of discovered work items to be supplied to the recovery engine 202. As described above, at a block 410 information identifying the work items (e.g., work item identifiers) identified during the discovery process is subsequently supplied by the replication provider 112P to the recovery engine 202 for use in executing the workflow steps. In some examples, the work item identifiers take the form of a consistency group identifier.

Figure 5:
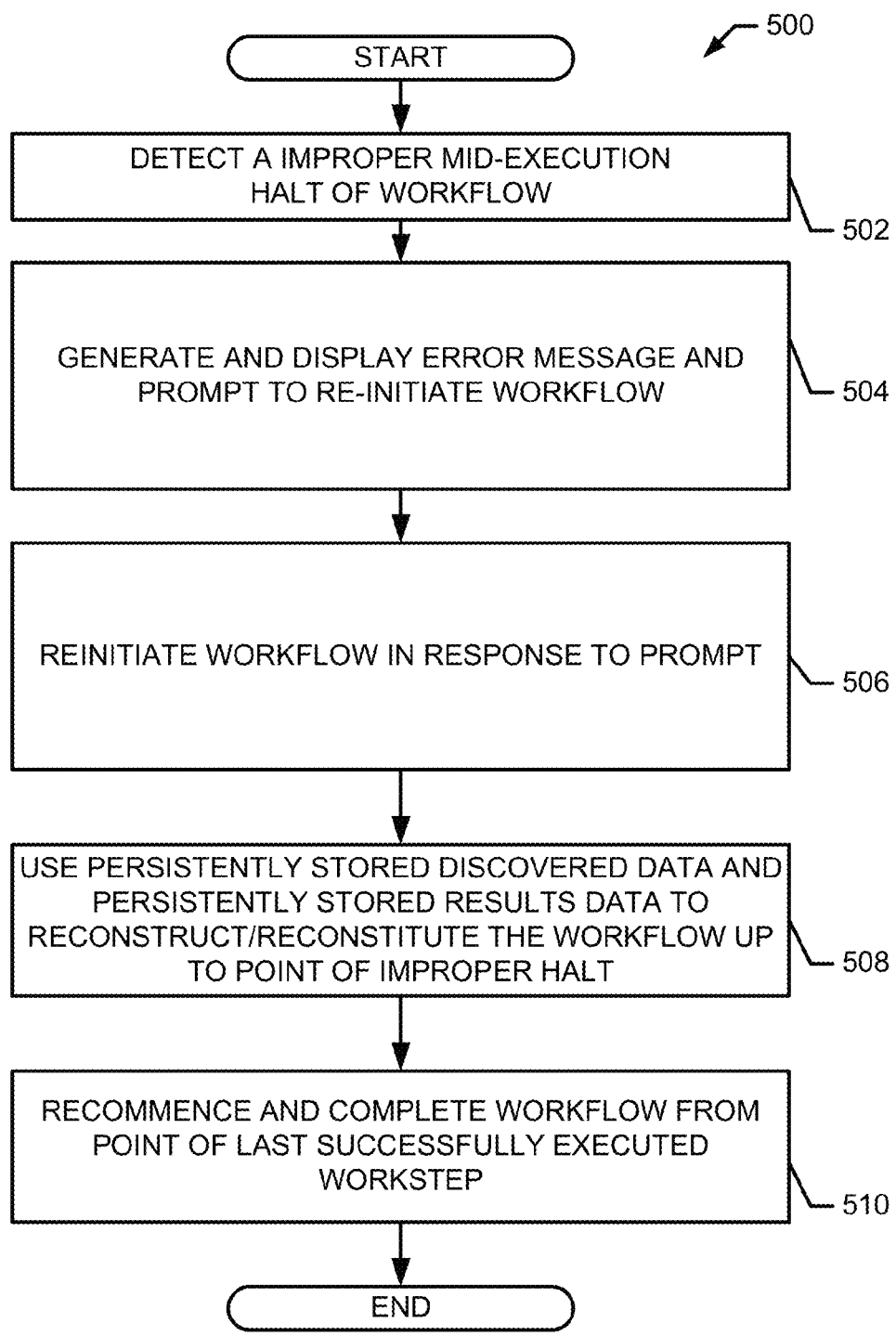
FIG. 5 is a flow chart representative of example machine readable instructions that may be executed to implement the site recovery tool of FIG. 2.

Example machine readable instructions that may be executed to implement the site recovery tool 102P of FIGS. 1 and 2 are represented by the flowchart 500 illustrated in FIG. 5. The example machine readable instructions 500 may be executed at intervals (e.g., predetermined intervals), based on an occurrence of an event (e.g., a predetermined event), etc., and/or any combination thereof.

The example machine readable instructions represented by the flowchart 500 begin at a block 502 at which the recovery engine 202 determines that a workflow has improperly halted mid-execution. In some examples, the workflow improperly halted due to a crash of a processor on which the site recovery tool 110P (see FIGS. 1 and 2) was operating. In such examples, at a block 504 the recovery engine 202 causes an error message to be transmitted to the example display server 210 indicating that the workflow was improperly halted and the display server 210 causes the message to be transmitted to the example display 212 (see FIG. 2) for display to a user. Additionally, the display server 210 may cause a prompt to be displayed at the display 212 indicating that the user may re-initiate the workflow.

At a block 506, a user input to re-initiate the workflow is supplied by the example user interface 208 to the example recovery plan module 206 and thereafter sent to the example recovery engine 202. At a block 508, the example recovery engine 202 uses the discovered data stored in the results container 220 and the corresponding results data stored in the results container 220 to be reconstruct the re-initiated workflow up to point at which the workflow was improperly halted. The discovered data and the results data having been stored in persistent storage (e.g., the discovered data container 216 and the results container) are unaffected by the crash and are thus available after the crash.

At a block 510, the recovery engine 202 recommences the workflow at the step occurring after the last successfully completed workflow step and continues execution of the workflow to completion.

Figure 6:
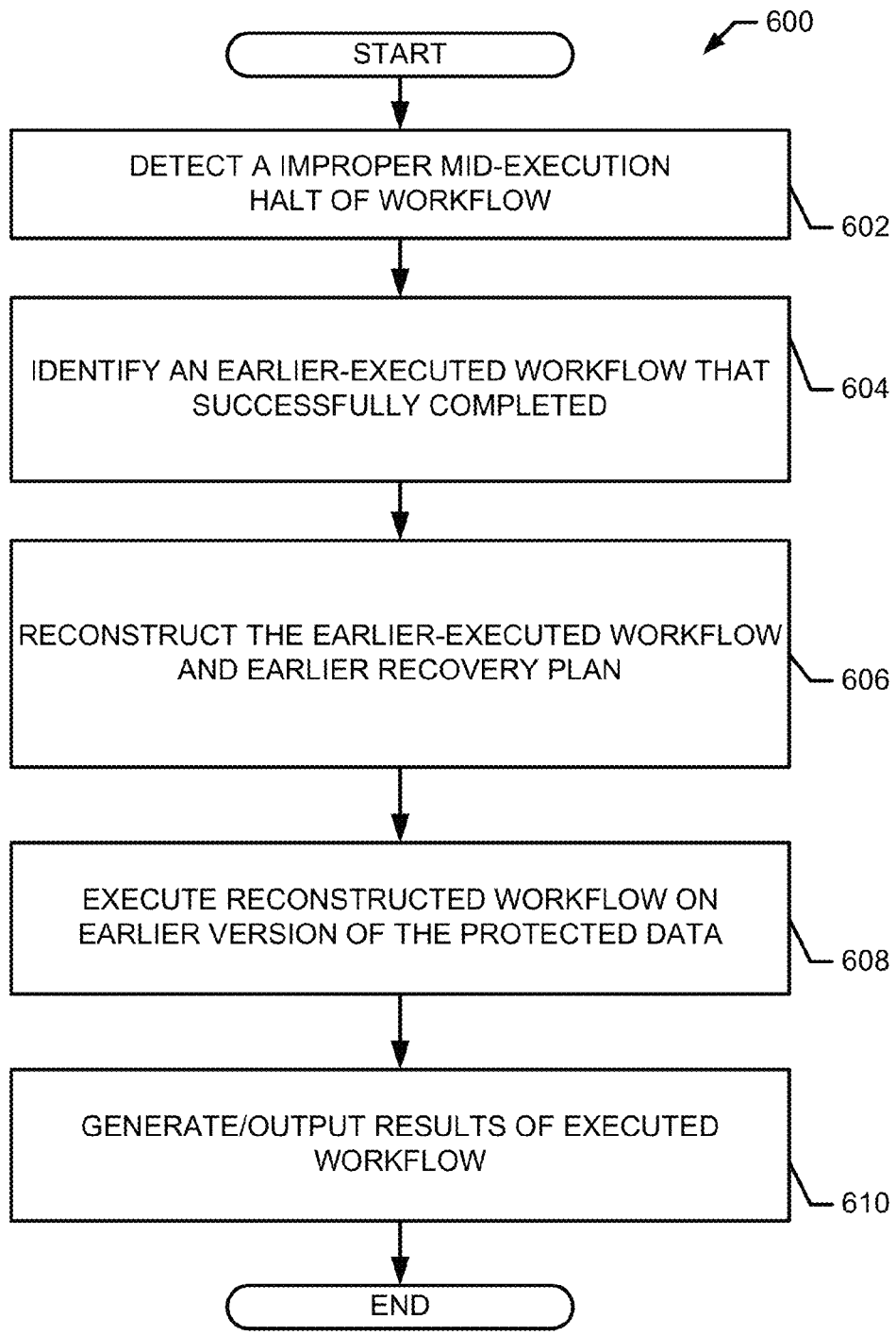
FIG. 6 is a flow chart representative of example machine readable instructions that may be executed to implement the site recovery tool of FIG. 2.

Example machine readable instructions that may be executed to implement the site recovery tool 102P of FIGS. 1 and 2 are represented by the flowchart 600 illustrated in FIG. 6. The example machine readable instructions 600 may be executed at intervals (e.g., predetermined intervals), based on an occurrence of an event (e.g., a predetermined event), etc., and/or any combination thereof.

The example machine readable instructions represented by the flowchart 600 begin at a block 602 at which the example recovery engine 202 (see FIG. 2) determines that a workflow step performed during execution of a workflow on an example recovery plan 204 (see FIG. 2) was unsuccessfully executed due to, for example, a communication failure with a virtual machine or storage device at the example protected site 102P (see FIG. 1) or at the example recovery site 102R (see FIG. 1). For example, the failure may have occurred when any of the virtual machines at the protected site 102P stopped communicating during a sync operation. Due to the failure, the most recent copy of the data at the protected site 102P is not able to be successfully replicated to the recovery site 102R. In addition, the integrity of the protected data at the protected site 102P may be in question. In such examples, the site recovery tool 110P can be used to recover the last copy of the protected data known to be intact.

At a block 604, the example recovery engine 202 identifies an earlier-executed workflow that was completed successfully on the example recovery plan 204 and reconstructs that earlier-executed workflow including the corresponding recovery plan. The earlier-executed workflow corresponds to the failed workflow. For example, if the failed workflow was performing a failover on the recovery plan 204, an earlier-executed failover workflow performed on the same recovery plan 204 is reconstructed using results associated with the earlier-executed failover workflow. Likewise, the recovery plan, as it existed at the earlier-time, is reconstructed.

At a block 606, the example recovery engine 202 executes the reconstructed workflow. However, when the reconstructed workflow is performed on the reconstructed recovery plan 204, the recovery engine 202 specifies that the workflow is to operate on an earlier version of the protected data that existed when the earlier workflow was executed (e.g., a version of the data known to be intact). The earlier version of the protected data is stored at the protected site 102P in a snapshot library.

At a block 608, results generated during the execution of the reconstructed workflow are configured at the display server 210 for presentation on the display 212. Thereafter, the method of FIG. 6 ends.

Recognizing that execution of the reconstructed workflow on the earlier version of the protected data will likely result in data loss, a user (such as a system administrator) may use other measures to compensate for any data loss resulting from execution of the reconstructed workflow.

Figure 7:
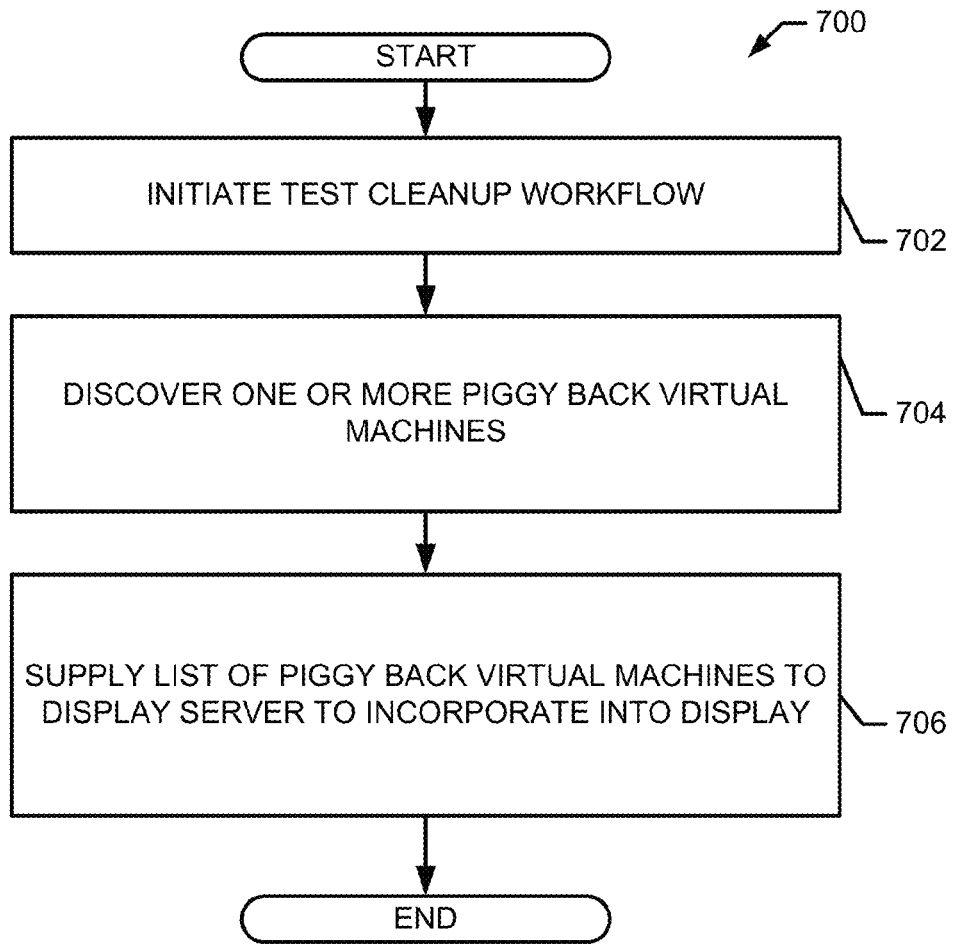
FIG. 7 is a flow chart representative of example machine readable instructions that may be executed to implement the site recovery tool of FIG. 2.

Example machine readable instructions that may be executed to implement the site recovery tool 102P of FIGS. 1 and 2 are represented by the flowchart 700 illustrated in FIG. 7. The example machine readable instructions 700 may be executed at intervals (e.g., predetermined intervals), based on an occurrence of an event (e.g., a predetermined event), etc., and/or any combination thereof.

The example machine readable instructions represented by the flowchart 700 begin at a block 702 at which a test cleanup workflow is initiated. In some examples, the test cleanup workflow is initiated on the example recovery plan 204 (see FIG. 2) via the user interface 208 (see FIG. 2). At a block 704, the example recovery engine 202 (see FIG. 2) issues a discover command to the replication provider 112P (see FIGS. 1 and 2). In response, the replication provider 112P searches the example replication configuration database 111P to identify consistency groups included in the protection group associated with the recovery plan 204. In some examples, the replication provider 112P detects a virtual machine(s) that is present on replicated storage (i.e., storage that is being replicated) but that is not protected by the site recovery tool (referred to herein as a piggy back virtual machine). The replication provider 112P detects piggy back virtual machines by searching the identified consistency groups to determine a set of virtual machines contained in the consistency group. In addition, the replication provider 112P determines whether any of the virtual machines contained in the consistency group are not associated with a storage profile. If so, the replication provider 112P indicates to the recovery engine 202 that the virtual machine(s) is a piggyback virtual machine.

In some examples, the replication provider 112P searches the identified consistency group to determine a set of virtual machines contained in the consistency group and determines whether any of the virtual machines are present on a replicated storage but not protected by the site recovery tool. If so, the replication provider 112P indicates to the recovery engine 202 that the virtual machine(s) is a piggyback virtual machine.

At a block 706 the recovery engine 202 supplies the list of piggyback virtual machines to the example display server 210 (see FIG. 2) for presentation on the example display 212 (see FIG. 2). Thereafter, the of FIG. 7 method ends. The user can then determine how to reconfigure the virtual data center 102P in such a way that the piggyback virtual machines will be properly protected.

Figure 8A:
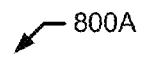
FIG. 8A is an example initial display structure generated by the example site recovery tool of FIG. 2.
Figure 8B:
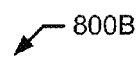
FIG. 8B is an example updated display structure updated by the example site recovery tool of FIG. 2 to reflect discovered work items.

FIG. 8A illustrates an example initial display structure 800A generated by the example site recovery tool of FIG. 2. FIG. 8B illustrates an example updated display structure 800B generated by the example site recovery tool 200 of FIG. 2 to reflect discovered work items to be included in a protection group associated with the workflow. In some examples, the initial display structure 800A identifies a name of a recovery workflow to be performed 802 (e.g., Cleanup Test Virtual Machines) and a protection group to be operated on by the workflow 804 (e.g., Protection Group Cleanup Workflow). An example first step 806 of the workflow can include discovering virtual machines to be operated on during the workflow (e.g., Discover Cleanup Test Virtual Machines) and an example second step 808 of the workflow can include performing the cleanup test on the virtual machines included in the protection group. As illustrated in FIG. 8A, in some examples, the initial display structure 800A may indicate that virtual machines to be included in the protection group are not yet identified (e.g., no virtual machines are listed under the second step 808. As further illustrated in FIG. 8B, in some examples, the example updated display structure 800B updated by the example site recovery tool 200 (see FIG. 2) can include all of the information included in the initial display structure 800A and can also include work items discovered by the workflow discovery operation of the workflow 810, 812 (e.g., Virtual Machine 1 and Virtual Machine 2).

Figure 9:
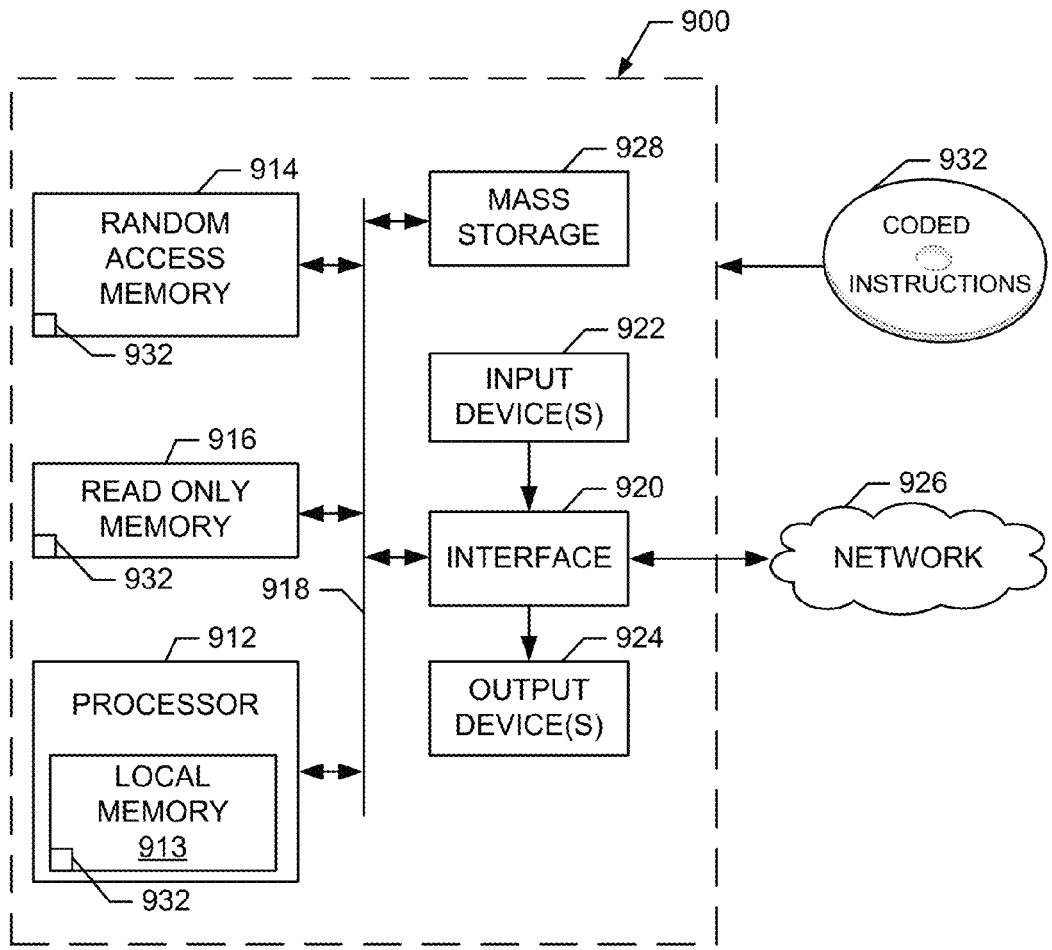
FIG. 9 is a schematic illustration of an example processor platform that may be used and/or programmed to execute the example processes and/or the example machine-accessible instructions of FIGS. 3A, 3B, 4, 5, 6 and 7 and/or to implement any or all of the example methods, apparatus and/or articles of manufacture described herein.

FIG. 9 is a block diagram of an example processor platform 900 capable of executing the instructions of FIGS. 3A, 3B, 4, 5, 6, and 7 to implement the apparatus (e.g., the site recovery tools 110P, 110R, the replication providers 112P, 112R, the virtual data center managers 108P, 108R, the virtual machines 104P, 104R, the recovery engine 202, the display server 210, etc.) of FIGS. 1 and 2. The processor platform 900 can be, for example, a server, a personal computer, an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 3A, 3B, 4, 5, 6, and 7 may be stored in the mass storage device 928, in the volatile memory 914, in the non-volatile memory 916, and/or on a removable tangible computer readable storage medium such as a CD or DVD.

From the foregoing, it will appreciated that the above disclosed methods, apparatus and articles of manufacture perform a discovery operation that discovers work items to be included in a protection group while a corresponding workflow is being executed. Thus, the need to manually enter information identifying work items to a site recovery tool each time a virtual data center is reconfigured and/or each time a storage device is associated with a storage profile included in a protection group is eliminated. The example methods, apparatus, systems and articles of manufacture also provide a mechanism to provide status information about the progress of workflow operations performed on such discovered work items. The ability to present status information on workflow steps performed on the protection group devices/work items gives a user the ability to identify and, if needed, respond to workflow steps that are progressing in an undesired manner.

Additionally, as described above, the example methods, apparatus, systems and articles of manufacture (e.g., physical storage media) disclosed herein provide a mechanism by which the results of the workflow steps performed on discovered data items are saved in a persistable memory. The saved information can be used to reconstruct/reconstitute a workflow that was halted mid-execution due to a server crash. As a result, when the server is brought back online, the workflow need not be restarted from the beginning but can instead be restarted from the point occurring before the crash.

The example methods, apparatus, systems and articles of manufacture (e.g., physical storage media) disclosed herein can also be used to determine that data stored in a recovery site 102R at a second, later time is to be replaced with data stored in the protected site 102P at a first, earlier time when a test workflow performed at the second time indicates that the test workflow performed at the second, later time was unsuccessful.

The example methods, apparatus, systems and articles of manufacture (e.g., physical storage media) disclosed herein are also able to identify virtual machines having virtual machine files only some of which reside on replicated storage, virtual machines that reside on a replicated storage device but that are not associated with a protection group, etc. (also referred to as piggyback virtual machines).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to perform site recovery of a virtual data center, the method comprising:
   during execution of a site recovery workflow on a recovery plan, discovering a work item to be included in a protection group associated with the recovery plan, the work item not being identified in the recovery plan prior to execution of the site recovery workflow;
   causing an operation of the site recovery workflow to be performed on the work item; and
   storing, in a persistable data container, a work item identifier identifying the work item and a result indicating the outcome of the operation performed on the work item, the persistable data container being accessible to a status output device.

2. A method as defined in claim 1, further comprising causing the status output device to output status information during execution of the site recovery workflow, the status information to include the work item identifier and the result.

3. A method as defined in claim 2, further comprising causing the status output device to register to receive a notification indicating when the work item has been discovered.

4. A method as defined in claim 2 further comprising:
   in response to a failure of the site recovery workflow, using the work item identifier and the result to reconstruct the site recovery workflow up to a last successfully completed workflow step; and
   restarting the site recovery workflow from the last successfully completed workflow step.

5. A method as defined in claim 1, the method further comprising issuing a discover command to a replication provider, the discover command to identify a policy associated with the protection group wherein discovering the work item includes using the policy.

6. A method as defined in claim 1, wherein the work item is a first work item and the work item identifier is a first work item identifier, the method further comprising:
   generating an initial display structure that presents a second work item identifier identifying a second work item but does not present the first work item identifier, the second work item being identified in the recovery plan prior to execution of the site recovery workflow; and
   during execution of the site recovery workflow, updating the initial display structure to generate a modified display structure, the modified display structure incorporating the first work item identifier.

7. A method as defined in claim 1, further comprising:
   determining that the site recovery workflow failed to execute successfully;
   determining an earlier time at which an earlier-executed site recovery workflow successfully executed;
   reconstructing the earlier-executed site recovery workflow; and
   re-executing the earlier-executed site recovery workflow to cause data stored at a protected site to be recovered at a recovery site, the data to be recovered being stored at the protected site as a set of snapshots collected site at the earlier time.

8. A method as defined in claim 1, further comprising executing a cleanup site recovery workflow to detect a virtual machine on replicated storage that is not associated with the protection group.

9. A site recovery tool comprising:
   a recovery engine to issue a discover command to discover a first work item to be included in a protection group associated with a recovery plan, the first work item not being identified in the recovery plan prior to execution of the site recovery workflow, the discover command being issued during execution of the site recovery workflow;
   a persistable data container to store a first work item identifier identifying the first work item and a result indicating an outcome of an operation performed on the first work item;
   a status output device to:
      generate an initial display structure that includes a second work item identifier identifying a second work item,
      detect when the first work item identifier is placed in the persistable data container, and
      modify the initial display structure to create a modified display structure incorporating the first work item.

10. A site recovery tool as defined in claim 9 further comprising
   a results monitor to determine when the result is generated and to supply the result to the status output device.

11. A site recovery tool as defined in claim 9 wherein the status output device is further to register to receive a first notification indicating that the work item has been discovered and, in response to the first notification, retrieve the work item identifier from the persistable data container.

12. A site recovery tool as defined in claim 9 wherein the recovery engine is further to use the work item identifier and the result to reconstruct the site recovery workflow as it existed at a first time and to restart the site recovery workflow as it existed at the first time in response to the failure of the site recovery workflow at a second, later time.

13. A site recovery tool as defined in claim 9 wherein the recovery engine is further to:
   reconstruct the site recovery workflow up to a last successfully completed workflow step; and
   restart the workflow at the last successfully completed workflow step.

14. A site recovery tool as defined in claim 9 wherein the discover command is to identify a policy associated with the protection group, and work item being discovered based on the policy.

15. A tangible machine readable storage medium comprising instructions that, when executed, cause a machine to at least:
   during execution of a site recovery workflow on a recovery plan, issue a discover command to discover a work item to be included in a protection group associated with the recovery plan, the work item not being identified in the recovery plan prior to execution of the site recovery workflow;
   cause an operation of the site recovery workflow to be performed on the work item; and
   store, in a persistable data container, a work item identifier identifying the work item and a result indicating the outcome of the operation performed on the work item, the persistable data container being accessible to a status output device.

16. A tangible machine readable storage medium as defined in claim 15, the instructions further to cause the machine to output status information during execution of the site recovery workflow, the status information to include the work item identifier and the result.

17. A tangible machine readable storage medium as defined in claim 16, the instructions further to cause the machine to:
   in response to a failure of the site recovery workflow, use the work item identifier and the result to reconstruct the site recovery workflow up to a last successfully completed workflow step; and
   restart the site recovery workflow from the last successfully completed workflow step.

18. A tangible machine readable storage medium as defined in claim 15 wherein the discover command identifies a policy associated with the protection group, wherein the work item is discovered using the policy.

19. A tangible machine readable storage medium as defined in claim 15, the instructions further to cause the machine to:
   determine that the site recovery workflow failed to execute successfully;
   determine an earlier time at which an earlier-executed site recovery workflow successfully executed;
   reconstruct the earlier-executed site recovery workflow; and
   re-execute the earlier-executed site recovery workflow to cause data stored at a protected site to be recovered at a recovery site, the data to be recovered being stored at the protected site as a set of snapshots collected site at the earlier time.

20. A tangible machine readable storage medium as defined in claim 15, the instructions further to cause the machine to execute a cleanup site recovery workflow to detect a virtual machine on a replicated storage that is not associated with the protection group.

* * * * *